United States Patent
Hirose

[11] Patent Number: 5,902,383
[45] Date of Patent: May 11, 1999

[54] DUST COLLECTION APPARATUS HAVING PACKED TOWER

[75] Inventor: Takashi Hirose, Yamagata, Japan

[73] Assignee: NEC Corporation, Tokyo, Japan

[21] Appl. No.: 08/974,343

[22] Filed: Nov. 19, 1997

[30] Foreign Application Priority Data

Nov. 19, 1996 [JP] Japan .................................. 8-308483

[51] Int. Cl.⁶ .................................................. B01D 46/04
[52] U.S. Cl. ............................................. 96/231; 95/212
[58] Field of Search ........................... 95/210, 211, 212; 96/290, 291, FOR 123, 300, 231

[56] References Cited

U.S. PATENT DOCUMENTS

| 3,376,353 | 4/1968 | Tate ............................................. 95/210 |
| 3,754,378 | 8/1973 | Christensen et al. ...................... 95/212 |
| 4,941,898 | 7/1990 | Kimura ...................................... 96/291 |

FOREIGN PATENT DOCUMENTS

| 84410 | 7/1983 | European Pat. Off. ................. 95/210 |
| 88/09204 | 12/1988 | WIPO ............................. 96/FOR 123 |
| 95/03875 | 2/1995 | WIPO ............................. 96/FOR 123 |

Primary Examiner—Duane S. Smith
Attorney, Agent, or Firm—Sughrue, Mion, Zinn Macpeak & Seas, PLLC

[57] ABSTRACT

A dust collection apparatus includes a tower main body, a filter, a rotating shaft, a rotating mechanism, and a cleaning solution. The tower main body has a suction port through which an exhaust gas containing at least one of a noxious material and dust to be exhausted is taken, and an exhaust port through which a clean gas is discharged. The filter is accommodated in the tower main body and cleans the exhaust gas taken in through the suction port and performs dust collection. The filter is divided into a plurality of discrete filters and is supported to be movable. The rotating shaft and rotating mechanism move the discrete filters simultaneously. The discrete filters are sequentially dipped in the cleaning solution during movement, and are cleaned.

13 Claims, 3 Drawing Sheets

DUST COLLECTION APPARATUS HAVING PACKED TOWER

BACKGROUND OF THE INVENTION

The present invention relates to a dust collection apparatus having a packed tower and, more particularly, to a dust collection apparatus for cleaning an exhaust gas containing a noxious material of semiconductor devices or dust by using a filter.

FIG. 3 shows an example of a conventional dust collection apparatus having a packed tower. Conventionally, as shown in FIG. 3, a dust collection apparatus of this type has a tower main body 20, a filter 4, a demister 5, a circulating pump 7, supply nozzles 8, and an oblique plate 3. The tower main body 20 has a suction port 1 and an exhaust port 2 through which the exhaust gas is taken and exhausted, respectively. The filter 4 is accommodated in the tower main body 20 to separate the noxious material. The demister 5 removes the water content from the exhaust gas to be exhausted through the exhaust port 2. The circulating pump 7 circulates a cleaning solution 6 reserved in the lower portion of the tower main body 20. The supply nozzles 8 supply the cleaning solution 6 to the filter 4. The oblique plate 3 guides the exhaust gas so as to flow toward the filter 4 in the tower main body 20.

A supply valve 10, a supply port 9, a discharge valve 12, and a discharge port 11 are formed along the circulation line of the cleaning solution 6. The cleaning solution 6 is periodically exchanged to prevent it from deterioration.

The operation of the conventional dust collection apparatus having the above arrangement will be described. First, the exhaust gas containing a noxious gas or dust is fed into the tower main body 20 of the packed tower through the suction port 1. The exhaust gas fed through the suction port 1 is straightened toward the filter 4 by the oblique plate 3 so that it will not form a turbulent flow in the tower main body 20. The cleaning solution 6 sprayed from the supply nozzles 8 arranged above the filter 4 forms a solution film on the surface of the packing of the filter 4 and causes direct inertial collision with the exhaust gas. Cleaning and dust collection are performed through diffusion and attachment of the fine particles of the exhaust gas. Thereafter, the water content is removed by the demister 5 arranged in the later stage, and the cleaned exhaust gas is discharged through the exhaust port 2.

The cleaning solution 6 is circulated in the packed tower by the circulating pump 7 and is adjusted such that its amount in the packed tower is constant. In order to prevent deterioration of the cleaning solution 6 the discharge valve 12 is periodically opened and the cleaning solution 6 is discharged through the discharge port 11. The supply valve 10 is opened and the cleaning solution 6 is replenished by an amount corresponding to the amount discharged through the supply port 9, so that the amount of the cleaning solution 6 in the tower main body 20 is constant.

The first problem of the conventional dust collection apparatus is as follows. In the conventional dust collection apparatus described above, when the apparatus is installed in a semiconductor manufacturing factory that manufactures semiconductor devices 24 hours a day, operation must be performed with the risk of a high pressure loss. In this conventional packed tower type dust collection apparatus, in order to clean off the dust and reaction product attaching to the filter 4, the filter 4 must be extracted from the tower main body, cleaned, and packed in the tower main body again. This requires much labor and time. Therefore, in the factory that manufactures semiconductor devices 24 hours a day, the filter 4 can be cleaned only periodically, and the operation is performed with the dust and reaction product attaching to the filter 4.

SUMMARY OF THE INVENTION

It is an object of the present invention to provide a dust collection apparatus in which dust or reaction product attaching to the filter can be cleaned off arbitrarily and easily without stopping the apparatus.

It is another object of the present invention to provide a dust collection apparatus that can be operated with an always constant pressure loss without requiring much labor or time, thereby improving the reliability and maintenance.

In order to achieve the above objects, according to the present invention, there is provided a dust collection apparatus comprising a tower main body having a suction port through which an exhaust gas containing at least one of a noxious material and dust to be exhausted is taken, and an exhaust port through which a clean gas is discharged, a filter accommodated in the tower main body to clean the exhaust gas taken in through the suction port and perform dust collection, the filter being discrete filters into a plurality of divided and supported to be movable, driving means for moving the discrete filters simultaneously, and a cleaning solution in which the discrete filters are sequentially dipped during movement and are cleaned.

DESCRIPTION OF THE PREFERRED EMBODIMENT

The present invention will be described in detail with reference to the accompanying drawings.

Figure 1:
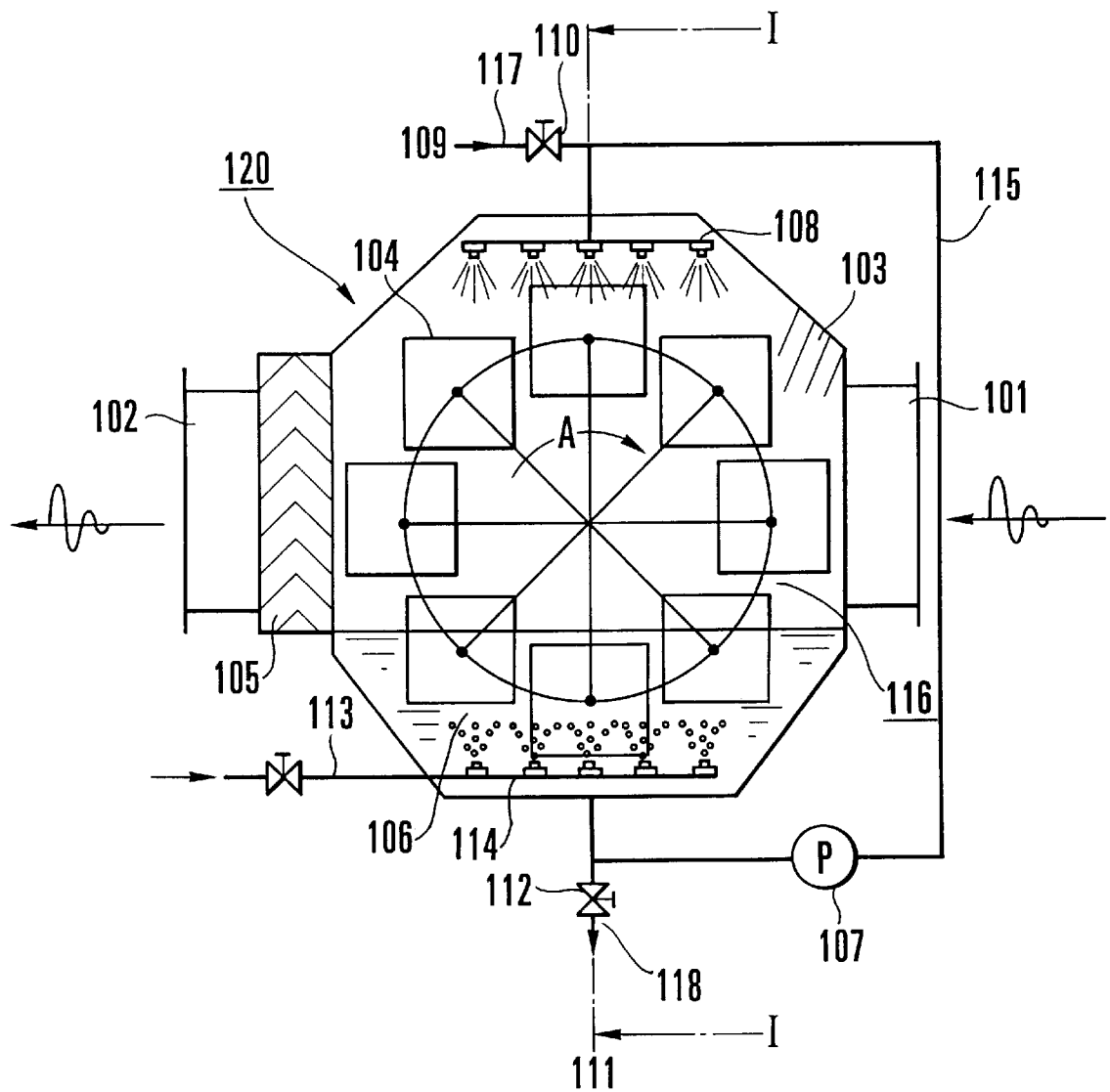
FIG. 1 is a longitudinal sectional view schematically showing a dust collection apparatus according to an embodiment of the present invention.
Figure 2:
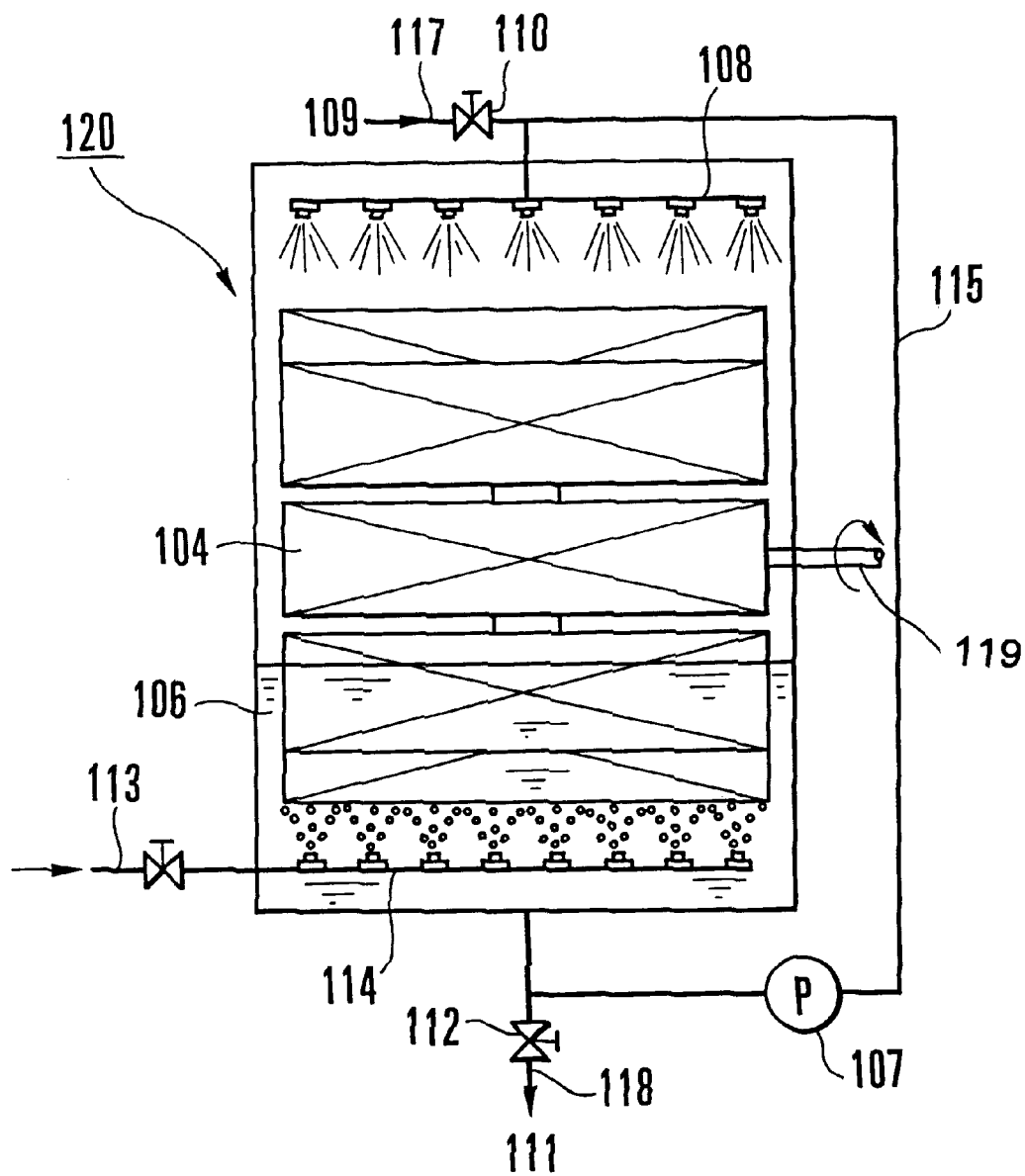
FIG. 2 is a schematic sectional view of the dust collection apparatus shown in FIG. 1 taken along the line I—I.
Figure 3:
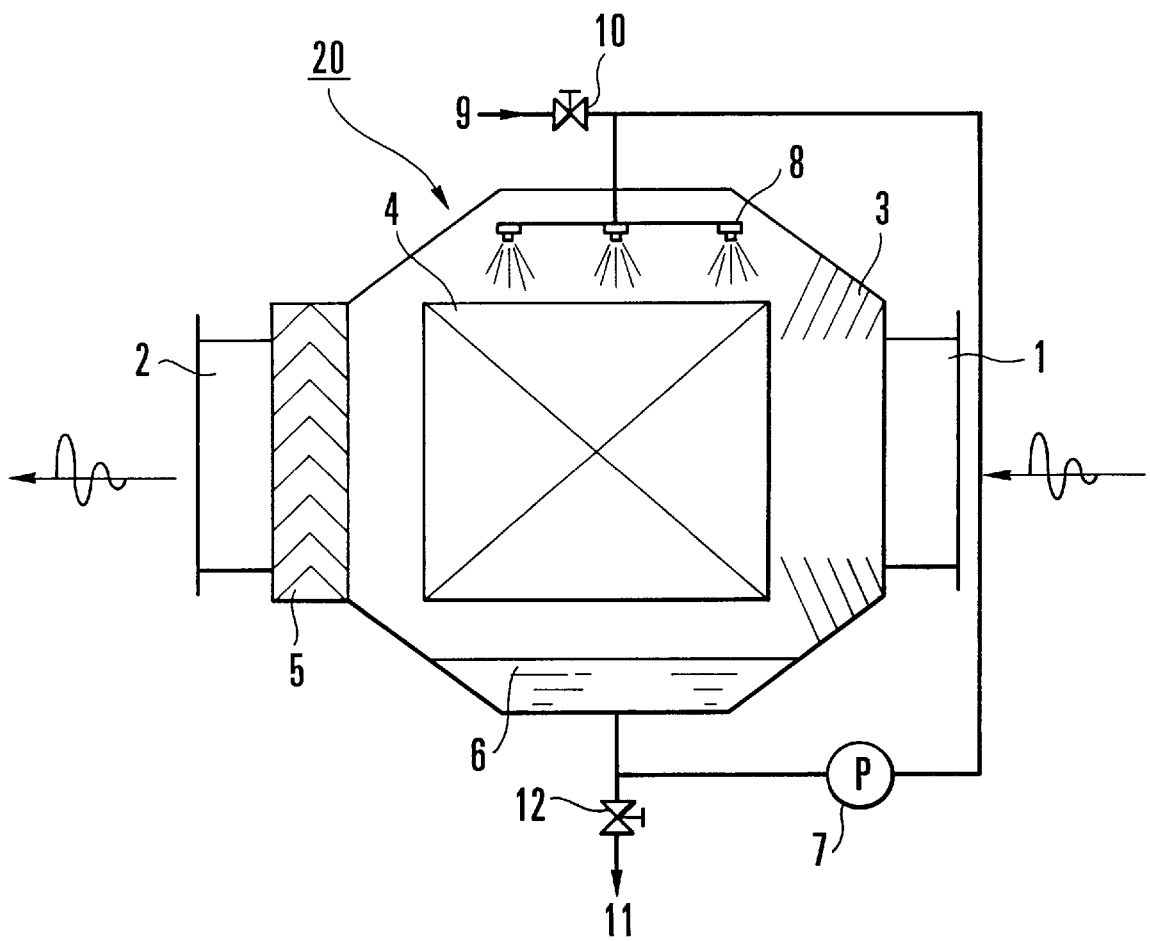
FIG. 3 is a longitudinal sectional view of a conventional dust collection apparatus.

FIGS. 1 and 2 schematically show a dust collection apparatus according to an embodiment of the present invention. Referring to FIG. 1, the dust collection apparatus of this embodiment has a tower main body 120, a filter unit 104, a demister 105, a circulating pump 107, supply nozzles 108, and an oblique plate 103. The tower main body 120 has a suction port 101 and an exhaust port 102 through which the exhaust gas is taken and exhausted, respectively. The filter unit 104 is accommodated in the tower main body 120 to separate the noxious material and dust from the exhaust gas taken through the suction port 101. The demister 105 removes the water content from the exhaust gas to be exhausted through the exhaust port 102. The circulating pump 107 circulates a cleaning solution 106, reserved in the lower portion of the tower main body 120, through a circulation line 115. The supply nozzles 108 are arranged in the upper portion of the tower main body 120 to supply the cleaning solution 106 to the filter unit 104. The oblique plate 103 guides the exhaust gas so as to flow toward the filter unit 104 in the tower main body 120.

The filter unit 104 is divided into eight discrete filters, and the discrete filters are supported such that they can be rotated by a rotating mechanism 116 through a predetermined angular interval like a merry-go-round. As shown in FIG. 2, the rotating mechanism 116 is rotated by rotating a rotating shaft 119 by a motor or the like, to rotationally move the filter unit 104 in the vertical direction. The discrete filters are equally spaced around the perimeter of the filter unit 104. Furthermore, the discrete filters are individually and independently rotatably secured to the filter unit 104. Nozzles 114 for spraying dry air into the reserved cleaning solution 106 and an air pipe 113 for supplying dry air to the nozzles 114 are arranged in the lower portion of the tower main body 120. A suction line 117, including a supply port 109 and a supply valve 110, and a discharge line 118, including a discharge port 111 and a discharge valve 112, branch from the circulation line 115 including the circulating pump 107 and the supply nozzles 108, to periodically exchange the cleaning solution 106, thereby preventing deterioration of the cleaning solution 106.

The operation of the cleaning device having the above arrangement will be described in detail with reference to FIGS. 1 and 2.

In the cleaning device of this embodiments the exhaust gas containing a noxious material or dust is fed into the tower main body 120 of the packed tower through the suction port 101. The exhaust gas fed into the tower main body 120 is straightened by the oblique plate 103 so that it will not form a turbulent flow in the tower main body 120, and passes through the divided filter 104. At this times the cleaning solution 106 sprayed from the supply nozzles 108 forms solution films on the surfaces of the respective packings of the discrete filters and causes direct inertial collision with the exhaust gas fed into the tower main body 120. Cleaning and dust collection are performed through diffusion and attachment of the fine particles of the exhaust gas. Thereafter, the water content is removed by the demister 105 arranged in the later stage, and the cleaned exhaust gas is exhausted through the exhaust port 102.

The filter unit 104 is intermittently rotated, e.g., once a day through 45° in the direction of an arrow A, by the rotating mechanism 116, and several ones of the discrete filters located in the lower portion are dipped in the cleaning solution 106. At this time, dry air is fed from the nozzles 114 into the cleaning solution 106 at a high pressure to remove the reaction product attaching to the discrete filters. The removed reaction product, together with the cleaning solution 106, is periodically removed outside the dust collection apparatus from the discharge port 111 through the discharge line 118 by opening the discharge valve 112.

The cleaning solution 106 is replenished for an amount corresponding to the removed amount, from the supply port 109 through the suction line 117 by opening the supply valve 110. The cleaning solution 106 is circulated by the circulating pump 107 through the circulation line 115. The solution is periodically discharged and supplied in order to prevent deterioration of the cleaning solution 106.

As has been described above, according to the present invention, periodical cleaning, which is conventionally done in order to remove the reaction product attaching to the filter by periodically stopping the dust collection apparatus while taking much labor and time, becomes unnecessary, and the dust collection apparatus can be operated with a constantly stable pressure loss. This is because since the filter is divided and the reaction product can be automatically removed in the tower main body at an arbitrary time, a constant pressure loss can be maintained to a certain degree even during operation of the dust collection apparatus.

What is claimed is:

1. A dust collection apparatus comprising:
    a tower main body having a suction portion through which an exhaust gas containing at least one of a noxious material and dust to be exhausted is taken, and an exhaust port through which a clean gas is discharged;
    a filter unit accommodated in said tower main body to clean the exhaust gas taken in through said suction port and perform dust collection, said filter unit including a plurality of discrete filters and supported to be movable;
    driving means for moving said plurality of discrete filters simultaneously; and
    a cleaning solution in which said plurality of discrete filters are sequentially dipped during movement and are cleaned.

2. An apparatus according to claim 1, wherein said driving means comprises:
    a rotating mechanism arranged at a center of said tower main body to rotationally move said plurality of discrete filters, and
    a rotating shalt for rotationally driving said rotating mechanism,
    wherein said plurality of discrete filters are sequentially dipped in said cleaning solution reserved in a lower portion of said tower main body to remove a reaction product attaching thereto.

3. An apparatus according to claim 2, wherein said rotating mechanism is rotationally driven periodically and intermittently, so that a plurality of ones of said plurality of discrete filters are dipped in said cleaning solution simultaneously.

4. An apparatus according to claim 1, further comprising an air nozzle for spraying dry air into said cleaning solution,
    wherein a reaction product attaching to said plurality of discrete filters is removed with the dry air sprayed through said air nozzle.

5. An apparatus according to claim 1, further comprising a supply nozzle arranged in an upper portion of said tower main body to spray said cleaning solution toward said plurality of discrete filters,
    wherein said cleaning solution forms a solution film on a surface of a packing of said plurality of discrete filters and directly collides against the exhaust gas taken in through said suction port to diffuse and attach fine particles, and
    said plurality of discrete filters are dipped in said cleaning solution sprayed from said suction nozzles and reserved in a lower portion of said tower main body.

6. An apparatus according to claim 5, further comprising a circulating system for circulating said cleaning solution reserved in said lower portion of said tower main body to said supply nozzle.

7. An apparatus according to claim 6, further comprising:
    a discharge system for discharging said cleaning solution from said circulating system; and
    a suction system for taking said cleaning solution into said circulating system.

8. An apparatus according to claim 1, further comprising:
    a guide plate for guiding the exhaust gas flowing from said exhaust port toward said filter unit; and
    a demister arranged at said exhaust port to remove a water content from a clean exhaust gas.

9. An apparatus according to claim 1, wherein said plurality of discrete filters are spaced apart from each other.

10. An apparatus according to claim 1, wherein said plurality of discrete filters are individually and independently rotatably secured to said filter unit.

11. An apparatus according to claim 2, wherein said rotating shaft is perpendicular to the flow of said exhaust gas as it passes through said filter unit.

12. A dust collections apparatus comprising:
- a tower main body having a suction portion through which an exhaust gas containing at least one of a noxious material and dust to be exhausted is taken, and an exhaust port through which a clean gas is discharged;
- a filter unit accommodated in said tower main body to clean the exhaust gas taken in through said suction port and perform dust collection, said filter unit including a plurality of filters and supported to be movable;
- driving means for moving said plurality of filters simultaneously;
- a cleaning solution in which said plurality of filters are sequentially dipped during movement and are cleaned; and
- an air nozzle for spraying dry air into said cleaning solution, wherein a reaction product attaching to said plurality of filters is removed with the dry air sprayed through said air nozzle.

13. An apparatus according to claim 1, wherein said plurality of discrete filters are completely immersed.

* * * * *